(12) United States Patent
Ishii et al.

(10) Patent No.: US 10,539,798 B2
(45) Date of Patent: Jan. 21, 2020

(54) OPTICS OF WEARABLE DISPLAY DEVICES

(71) Applicants: Fusao Ishii, Pittsburg, PA (US); Yuji Aburakawa, Tokyo (JP); Kazuhiko Takahashi, Tokyo (JP); Keiichi Murakami, Tokyo (JP); Mikiko Nakanishi, Yokosuka (JP)

(72) Inventors: Fusao Ishii, Pittsburg, PA (US); Yuji Aburakawa, Tokyo (JP); Kazuhiko Takahashi, Tokyo (JP); Keiichi Murakami, Tokyo (JP); Mikiko Nakanishi, Yokosuka (JP)

(73) Assignees: Fusao Ishii, Pittsburgh, PA (US); DOCOMO Incorporated, Tokyo (JP)

( * ) Notice: Subject to any disclaimer, the term of this patent is extended or adjusted under 35 U.S.C. 154(b) by 179 days.

(21) Appl. No.: 15/650,886

(22) Filed: Jul. 15, 2017

(65) Prior Publication Data

US 2018/0373038 A1    Dec. 27, 2018

(51) Int. Cl.
| | |
|---|---|
| *G02B 27/10* | (2006.01) |
| *G02B 27/01* | (2006.01) |
| *G02B 3/04* | (2006.01) |
| *G02B 5/10* | (2006.01) |
| *G02B 5/20* | (2006.01) |
| *G02B 17/00* | (2006.01) |
| *G02B 27/48* | (2006.01) |
| *G03B 21/20* | (2006.01) |
| *H04N 9/79* | (2006.01) |

(52) U.S. Cl.
CPC ........... *G02B 27/0172* (2013.01); *G02B 3/04* (2013.01); *G02B 5/10* (2013.01); *G02B 5/208* (2013.01); *G02B 17/008* (2013.01); *G02B 27/48* (2013.01); *G03B 21/204* (2013.01); *H04N 9/7908* (2013.01); *G02B 2027/011* (2013.01); *G02B 2027/0116* (2013.01); *G02B 2027/0123* (2013.01); *G02B 2027/0174* (2013.01); *G02B 2027/0178* (2013.01)

(58) Field of Classification Search
CPC . G02B 27/48; G02B 3/04; G02B 5/10; G02B 5/208; G02B 27/0172; G02B 17/008
See application file for complete search history.

(56) References Cited

U.S. PATENT DOCUMENTS

| | | | | |
|---|---|---|---|---|
| 6,012,816 | A * | 1/2000 | Beiser | G02B 27/0025 353/10 |
| 2002/0085468 | A1* | 7/2002 | Kobayashi | G11B 7/005 369/53.27 |
| 2007/0279598 | A1* | 12/2007 | Hisada | G03B 21/28 353/70 |
| 2009/0174632 | A1* | 7/2009 | Hajjar | G09G 3/02 345/81 |
| 2012/0044464 | A1* | 2/2012 | Sqalli | G02B 27/48 353/69 |
| 2012/0074294 | A1* | 3/2012 | Streuber | G01J 9/00 250/201.9 |

(Continued)

*Primary Examiner* — Joseph P Martinez
(74) *Attorney, Agent, or Firm* — Bo-In Lin

(57) ABSTRACT

A see-through image display system with high resolution up to 4K, wide field of view (FOV) beyond 60 degrees and small form factor is proposed. The optics for the display incorporates optical elements including hologram, DOE, lens and mirror with free form surfaces. This display system is suitable for a wearable display.

13 Claims, 25 Drawing Sheets

(56) References Cited

U.S. PATENT DOCUMENTS

| | | | |
|---|---|---|---|
| 2012/0235900 A1* | 9/2012 | Border | G02B 5/23 345/156 |
| 2013/0021658 A1* | 1/2013 | Miao | G02B 27/283 359/256 |
| 2013/0341523 A1* | 12/2013 | Citek | G02C 7/028 250/372 |
| 2015/0302773 A1* | 10/2015 | Ishii | G02B 6/0035 348/63 |

* cited by examiner

OPTICS OF WEARABLE DISPLAY DEVICES

CROSS REFERENCE TO RELATED APPLICATIONS

This application is a Non-Provisional Application that claims the benefits of a previously filed Provisional Application 62/493,082 filed on Jun. 21, 2016. This Application is also a Continuation in Part (CIP) of Patent Application PCT/US2014//000153 filed on Jun. 23, 2014, which is a Non-Provisional Application of a Provisional Application 61/957,258 filed on Jun. 27, 2013.

TECHNICAL FIELD

This invention relates to a display system for projecting an image to a diffractive optical element enabling a see-through display with high resolution and wide field of view. More particularly, this invention relates to a display suitable for wearable displays with very small form factor.

BACKGROUND ART

Wearable displays have received broad attention in recent years after smart phones became popular and are well accepted by the market. Wearable displays provide the benefits of hands free operation as well as showing the images to the person who wears the display at a distance same as regular sight. Because of these advantages, there are tremendous needs for wearable displays. However, the conventional near eye displays such as Head Mount Display, Head up Display and Eye Glass Type Display have not provided satisfied wearable display solutions to the viewers, because these conventional devices are often too heavy, too large, and too dark. Furthermore, these conventional wearable displays often have low resolution and many of them do not provide a see-through view and are mostly expensive and can only display small size of images. Therefore, there are urgent needs for providing wearable display devices that are light, small, bright, having high resolution with see-through viewing optical path. It is further desirable that the new wearable devices are inexpensive that can display large image and can be putted on in a stealthy manner without being detected by others that the person is wearing such a wearable device.

As shown in FIG. 1 and FIG. 1A, Kasai et al. disclosed in Patent U.S. Pat. No. 7,460,286 an eye glass as a type of display system that implements optics to provide a see-through capability with a holographic optical element. This display system projects images in the normal direction from a display device along a perpendicular direction for a surface of LCD display, to project the light containing an image that is led into optical wave guide and reflected toward the eye of viewer. However, due to the use of a waveguide, the field of view and resolution are very limited.

As shown in FIG. 2 and FIG. 2A, Mukawa et al. in SID 2008 Digest, ISSN/008-0966X/08/3901-0089, "A Full Color Eyewear Display using Holographic Planar Waveguides", disclose another eye glass as a type of display system that implements see-through capability with two plates of holographic optical elements. Again, this type of eye glass also uses a waveguide which limits a resolution the images and the field of view.

As shown in FIG. 3, Levola in SID 2006 Digest, ISSN0006-64•SID 06 DIGEST 0966X/06/3701-0064, entitled "Novel Diffractive Optical Components for Near to Eye Displays" discloses another display system implemented by locating LCD device in the middle of two eyes. However, such display system requires large protruded space which enlarges the form factor thus making the device too large and inconvenient as a wearable display system. The above three types of displays are using either holographic optical element (HOE) or diffractive optical element (DOE) and all of these optical displays have fundamental difficulties of large chroma aberration, cross talk of colors, large field curvature aberration and distortion aberration. Mukawa et al. explained how to reduce cross talk of colors using multiple wave guides, which makes the system heavier and thicker and further the efficiency of utilization of light is reduced. Kasai et al. used a single HOE which improves the efficiency of light utilization, however, the other aberrations remains and the FOB (field of view) has to be small so that these aberrations will not be conspicuous. Due to these difficulties, there are urgent needs to provide new and improved wearable display system such that the above discussed problems and limitations can be removed.

As shown in FIG. 4 and FIG. 4A, Li et al. disclosed in Patent U.S. Pat. No. 7,369,317 a compact display and camera module attachable to eye glasses. This eyeglass requires a thick PBS (polarized beam splitter) and the FOB (field of view) is rather small, Additionally, this eyeglass is not stealth since the presence of display is very obvious.

The examples such as that shown in FIG. 1 and FIG. 2 have successfully demonstrated to public that a wearable display with see-through image is possible by using holograms and wave guides. However, due to the size of field of view and resolution these systems have limited usefulness. In order to achieve a very large field of view over 60 degrees and high resolution over 1 million pixels, it is necessary to provide a new innovative system. One perspective of this invention is to disclose a new system and design which enables over 60 degrees viewing angle and high resolution from 1 to 8 million pixels, such as 4K display.

SUMMARY OF THE INVENTION

One prospect of this invention is to provide a see-through near eye display with a field of view that is nearly full size of the eyeglass. Another prospect of this invention is to provide the wearable display system with very compact optics and electronics of the system that can be embedded in the temple of eyeglass as will be further illustrated in different embodiments of this invention. Specifically, this invention discloses display device such as LCOS, LCD or DMD that is used to project an image toward a lens of eyeglass from its temple. As shown in different embodiments, this invention take advantages of the geometrical configuration of eyeglass and human eye wherein an image is projected from the temple of eyeglass to its eye-lens and reflected to a human eye. Furthermore, in order to keep the visibility of external scene, a hologram is used. Hologram can reflect only specified narrow band-width of light and the rest of light can pass through. Because of this narrow band selectivity of hologram, it will reflect the image light having the specified band-width and the image is superimposed onto the external image, so that viewer can see through the eyeglass. Different from the conventional display systems as that shown in FIG. 1 and FIG. 2, image light is projected from the temple of eyeglass directly without passing through a wave-guide. This arrangement allows much larger projection area than that of an optical projection using a wave-guide. The wearable display device of this invention thus enables a viewer to perceive a larger field of view with improved resolution. Additionally, the large aberrations such as Astigmatic and Comma caused by a tilted projection of the wearable devices are compensated to achieve high resolution. These aberration problems are resolved in this invention with a hybrid optical configuration implemented with a newly developed technique by combining both geometrical optics and wave optics simultaneously in addition to the usage of free-form lens and mirror.

An exemplary embodiment of this invention is shown in FIG. 19 and FIG. 22 that incorporates two free-form lenses (1904 and 1906), a mirror (1905) and a hologram (1902). Specifically, FIG. 19. FIG. 22 show how this system can fit around a human face as a wearable display device wherein free-form lens is defined as a lens having computer generated surfaces which do not necessarily have rotational symmetry.

To increase the resolution and to minimize the distortion, another lens is added as illustrated in FIG. 20. This example incorporates three free-form lenses (2005, 2006 and 2007), a free-from mirror (2004) and a hologram (2002).

Another exemplary embodiment of this invention is illustrated in FIG. 21, wherein three free-form lenses are used to increase the field of view. This exemplary embodiment shows a wearable display device with 67 degrees of field of view without sacrificing resolution and distortion.

DETAIL DESCRIPTIONS OF THE PREFERRED EMBODIMENTS

The detail descriptions of various embodiments below illustrate various see-through display wearable device with high resolution up to 4K (8 million pixels) and a large field of view over 60 degrees are provided in devices that have a very small form factor fitting inside the temple of eyeglass.

Figure 1:
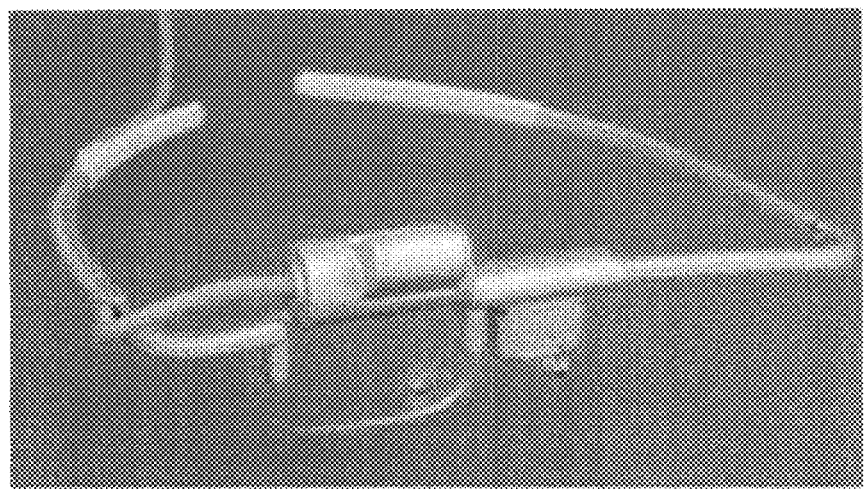
FIG. 1 is a cross sectional view of an image display system of prior art as that shown by Kasai in his published technical report related to U.S. Pat. No. 7,460,286.
Figure 1A:
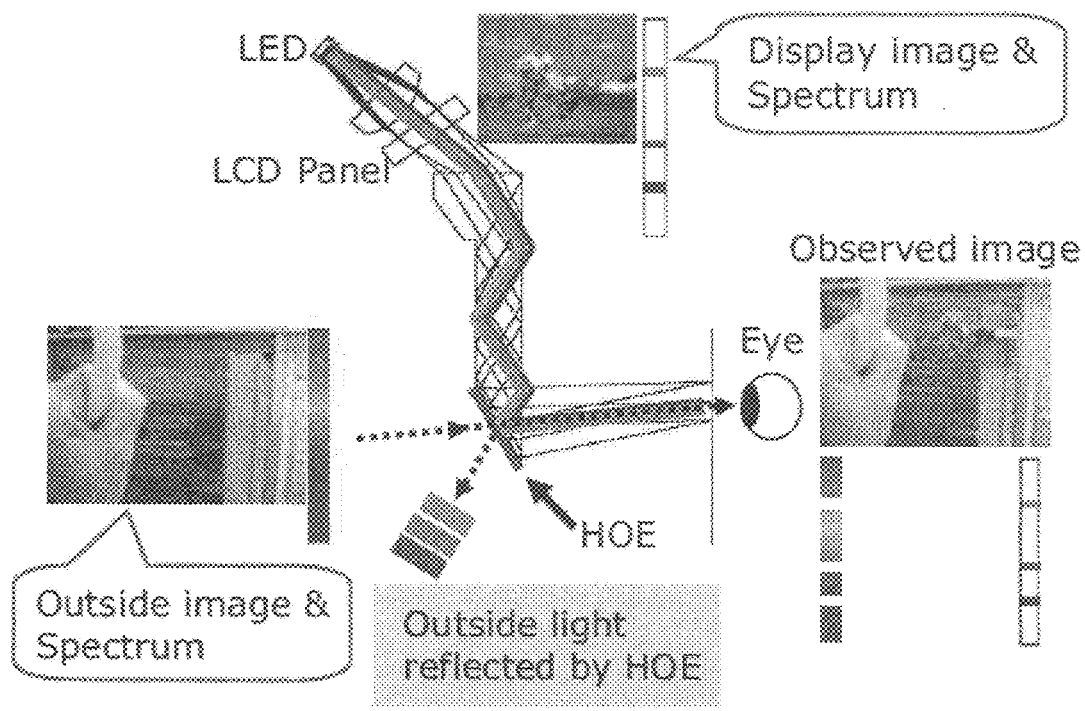
FIG. 1A is a photo of the actual sample which successfully demonstrated see-though capability.
Figure 2:
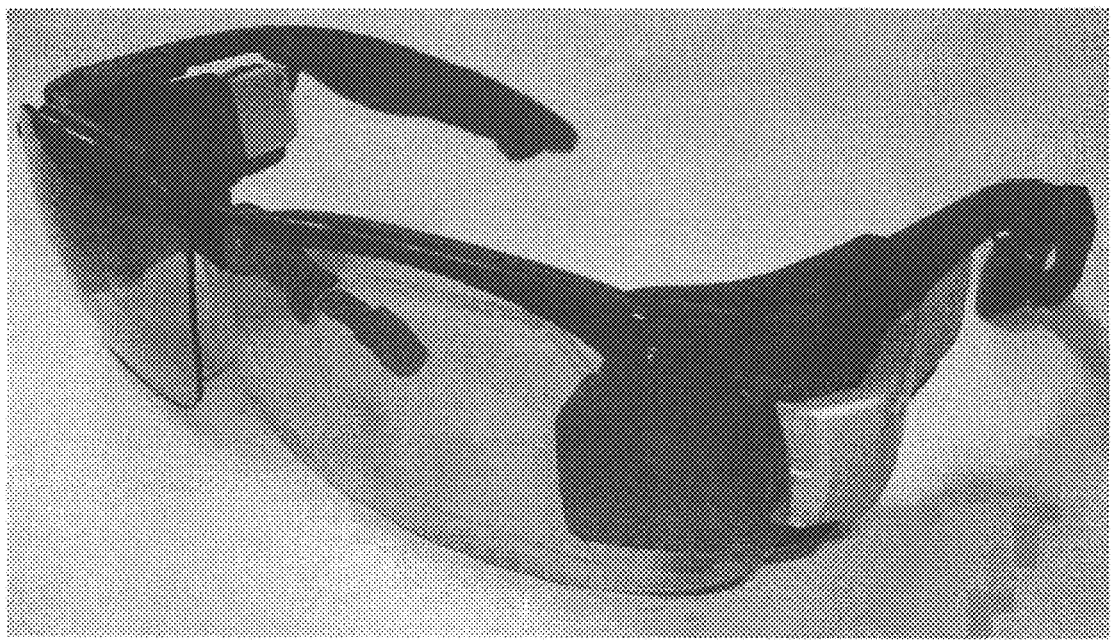
FIG. 2 and FIG. 2A are wearable display devices shown by Mukawa et al. in SID 2008 Digest, ISSN/008-0966X/08/3901-0089, "A Full Color Eyewear Display using Holographic Planar Waveguides" wherein FIG. 2A demonstrated see-through capability.
Figure 2A:
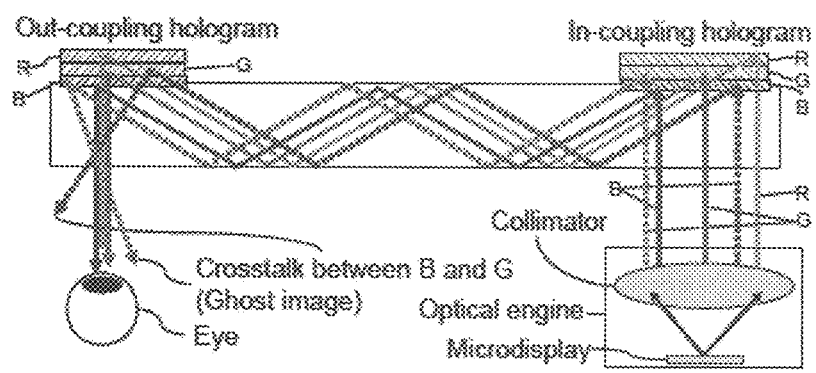
Figure 3:
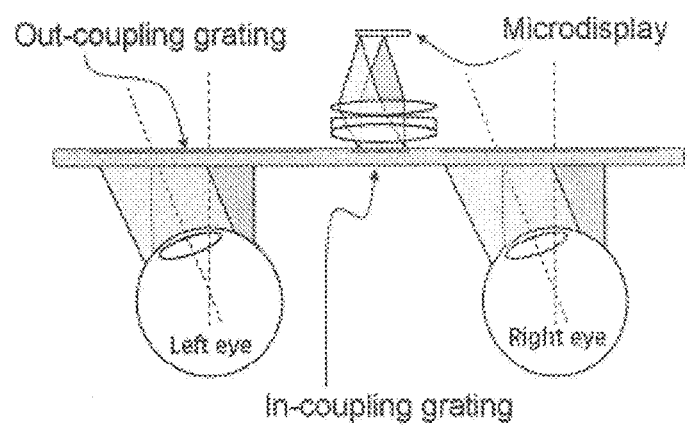
FIG. 3 is another example of prior art disclosure that is reported by Levola at SID 2006 Digest, ISSN0006-64•SID 06 DIGEST 0966X/06/3701-0064, "Novel Diffractive Optical Components for Near to Eye Displays".
Figure 4:
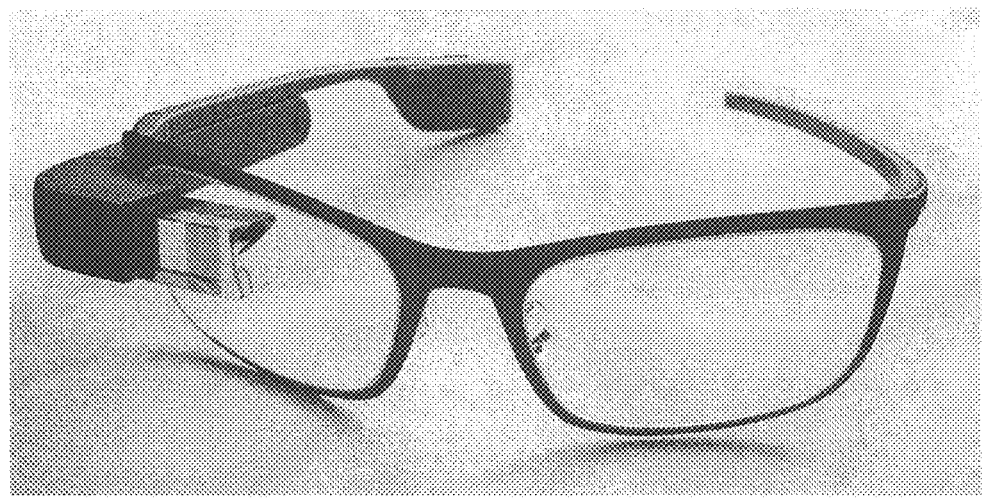
FIG. 4 shows another prior art disclosure of wearable display with see-through capability having both a display and a camera described in Patent U.S. Pat. No. 7,369,317.
Figure 4A:
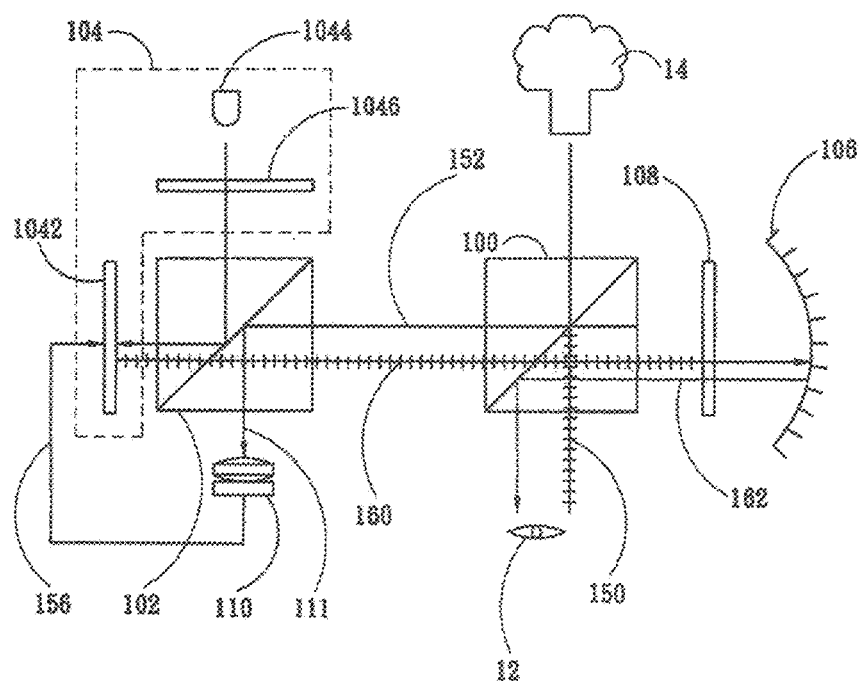
FIG. 4A is an example using a similar configuration of optics.
Figure 5:
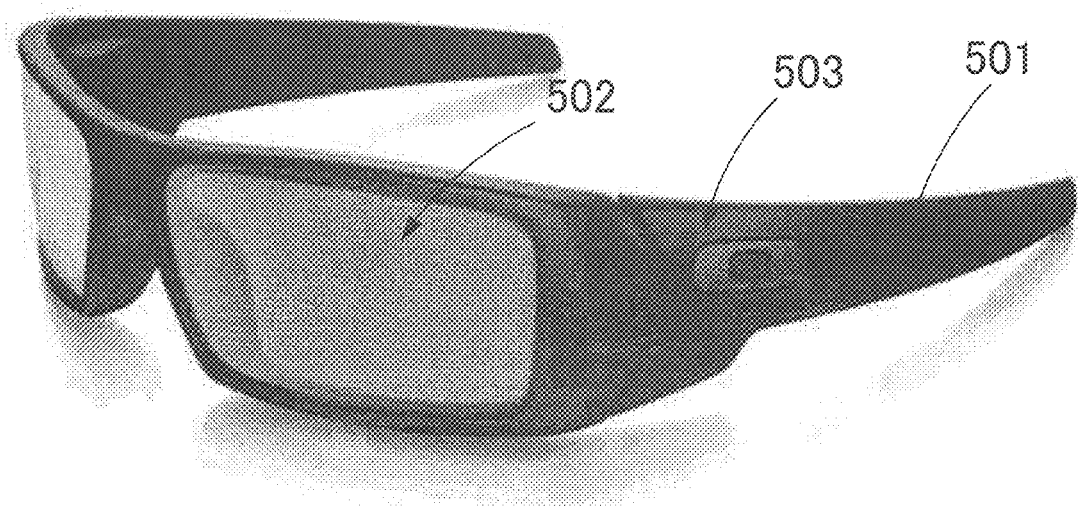
FIG. 5 and FIG. 6 are exemplary embodiments of eyeglasses having temples large enough to embed all optics and electronics of this invention, so that the existence of display is not noticeable.
Figure 6:
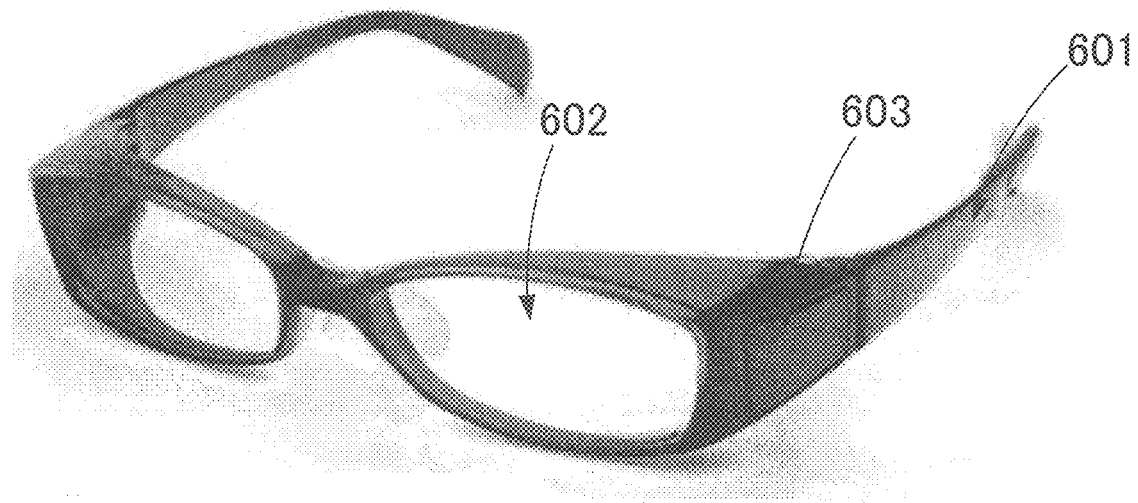
Figure 7:
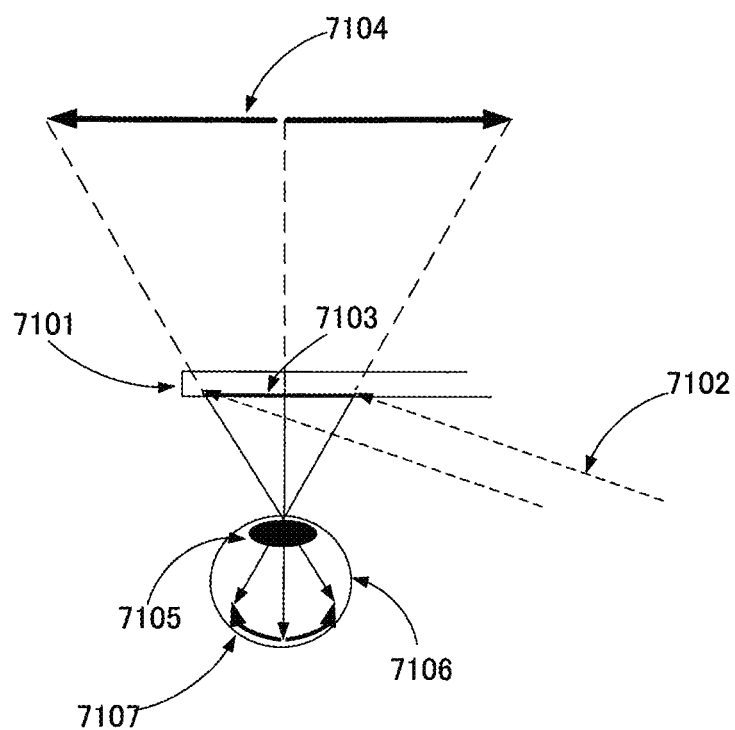
FIG. 7 illustrates the optical path of this invention wherein the projected light containing image (7102) from a temple of eyeglass is reflected toward the pupil of eye (7105) and the light is focused onto the retina (7107) to generate an image 7104) in front of the hologram at a distance.

FIG. 7 shows an example wherein an image in air as a see-through display, i.e., a virtual image, is generated in front of the eyes of viewer. The light rays (7102) containing the images are projected from side toward an eyeglass pane (7101) and an optical element (7103) reflects the light rays toward the pupil (7105) of eye (7108) and focused onto the retina (7107). The optical element (7103) has to reflect the rays (7102) in arbitrary direction different from symmetric mirror reflection to keep the optical element thin. The optical element (7103) can be a hologram (HOE) or a diffractive optical element (DOE). Both of these can be a see-through element to generate an image (7104). The use of half mirror requires tilt of mirror which ends up with a thick structure and not suitable for this type of application.

Figure 8:
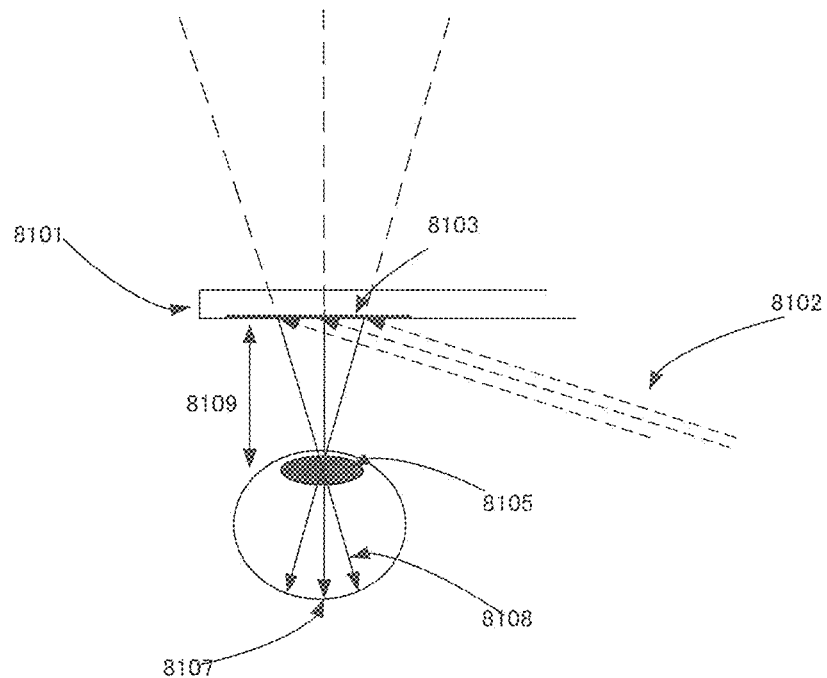
FIG. 8 shows the optical paths of another embodiment wherein substantially parallel light rays (8102) are projected to a hologram (8103) and reflected into the pupil of eye (8105), thus the hologram functions as a concave mirror having a focal length of the distance between the hologram and the pupil (8109) that is determined as the focal length of the hologram mirror.
Figure 9:
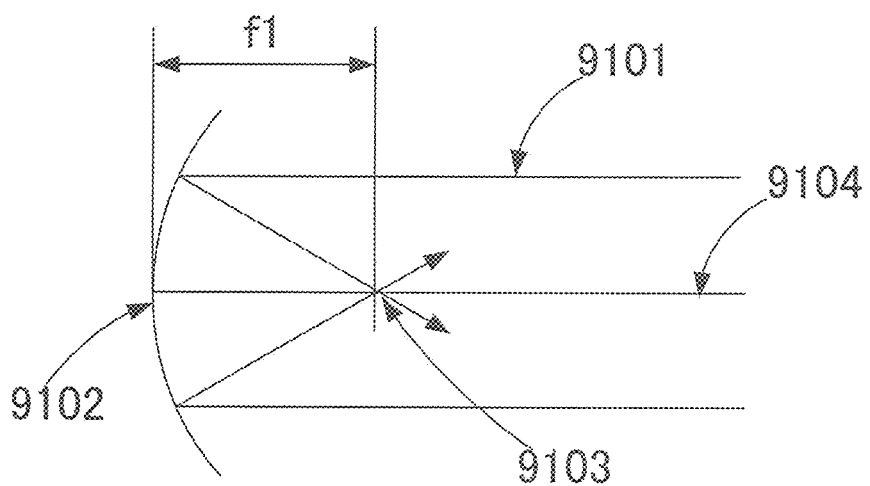
FIG. 9 shows a concave mirror (9102) reflecting incoming light rays (9101) parallel to the mirror axis (9104) into a single focal point (9103) wherein the surface of mirror (9102) is spherical or aspheric.

FIG. 8 shows the incoming rays (8102) are substantial parallel beams that are not diverging nor converging, wherein the incoming rays are projected to an optical element (8103) with a focal length that is about the distance (8109) between the eyeglass pane (8101) and the pupil of eye (8105) to focus on the retina (8107). If the incoming rays (8108) are diverging, it requires even shorter focal length.

FIG. 9 through FIG. 12 illustrate the tilted incoming rays converge into a single point (9103) on the horizontal axis (9104) as the simplest case wherein incoming rays (9101) are parallel to the horizontal axis (9104). The rays (9101) are reflected by a concave mirror (9102) and converged at the focal point (9103) of the concave mirror having a focal length f1. The curvature of the mirror can be spherical allowing some spherical aberration or aspherical surface without spherical aberration.

Figure 10:
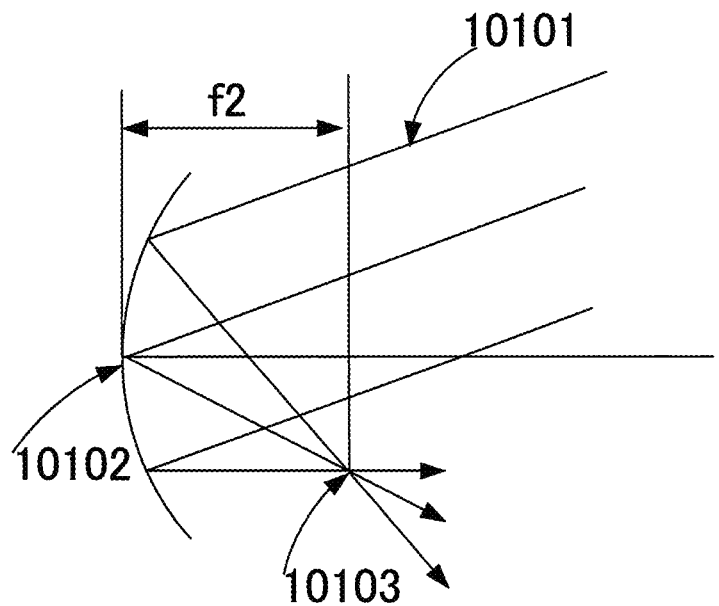
FIG. 10 shows a concave mirror (10102) reflecting incoming light rays (10101) from a direction tilted from the mirror axis into a single focal point (10103) wherein the surface of this mirror (10102) is free-form to converge at a single focal point (10103) and the focal length (f3) can be adjusted same as the previous example (f1).

FIG. 10 illustrates the tilted rays (10101) converge into a single point (10103). Tilted incoming rays create strong coma and astigmatic aberrations with a spherical mirror or lens. A mirror (10102) having a focal length f2 with a free-form surface can minimize these aberrations. The surface can be mathematically calculated and optimized. The surface is typically expressed in polynomial or spline functions.

Figure 11:
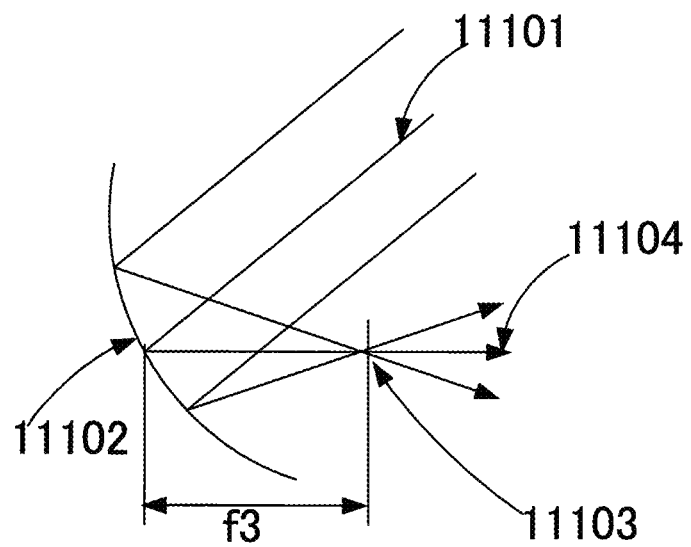
FIG. 11 illustrates a concave mirror (11102) reflecting incoming light rays (11101) from a direction tilted from the horizontal axis into a single focal point (11103) on the horizontal axis wherein the surface of this mirror (11102) is free-form to converge at a single focal point (11103) and the focal length (f3) can be adjusted same as the previous example (f1).

FIG. 11 illustrates that a tilted mirror (11102) with a free form surface to converge tilted rays (11101) into a point (11103) on the horizontal axis (11104). The tilted mirror (11102) requires larger form factor and not necessarily suitable for slim eyeglass display.

Figure 12:
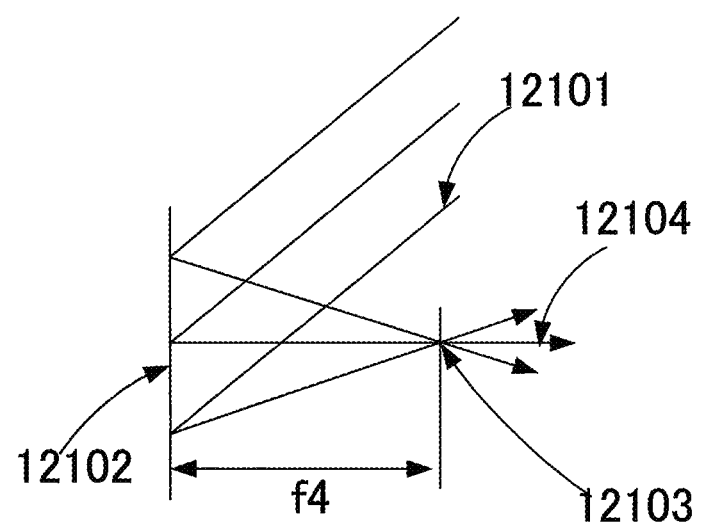
FIG. 12 illustrates a hologram (12102) reflecting incoming light rays (12101) from a direction tilted from the horizontal axis into a single focal point (12103) on the horizontal axis wherein the surface of this hologram (12102) is flat to converge at a single focal point (12103) on the horizontal axis and the focal length (f4) can be adjusted same as the previous example (f1). Because of hologram's very narrow band wave-selectivity, only specified bandwidth of light will be reflected and the majority of light will pass through thus creating a see-through eyeglass display.

FIG. 12 illustrates a thin and flat mirror (12102) is that is made with a hologram or a DOE with focal length f4 to converge the light beams (12101) into a single point (12103) on an axis (12104). Hologram and DOE are capable to reflect light in controlled or predesignated guide directions. Although the aberrations can be minimized with a phase shifting function of hologram or DOE designed mathematically, some residual aberrations remain and require further reduction for applications to project a high resolution image. The embodiments as shown below of this invention will show how these remaining aberrations can be further minimized with new and improved optical systems.

Figure 13:
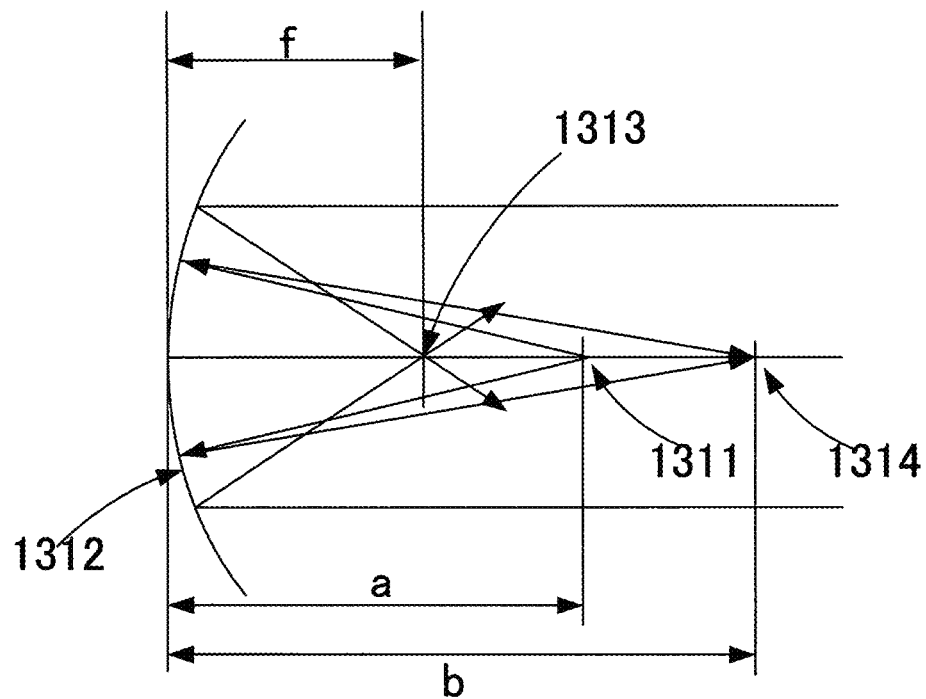
FIG. 13 shows an object (13101) located at the right side of focal length (13103) and the image is created at the right side of the hologram mirror (13104), which is not visible by the eye, because the image is located out of focus.
Figure 14:
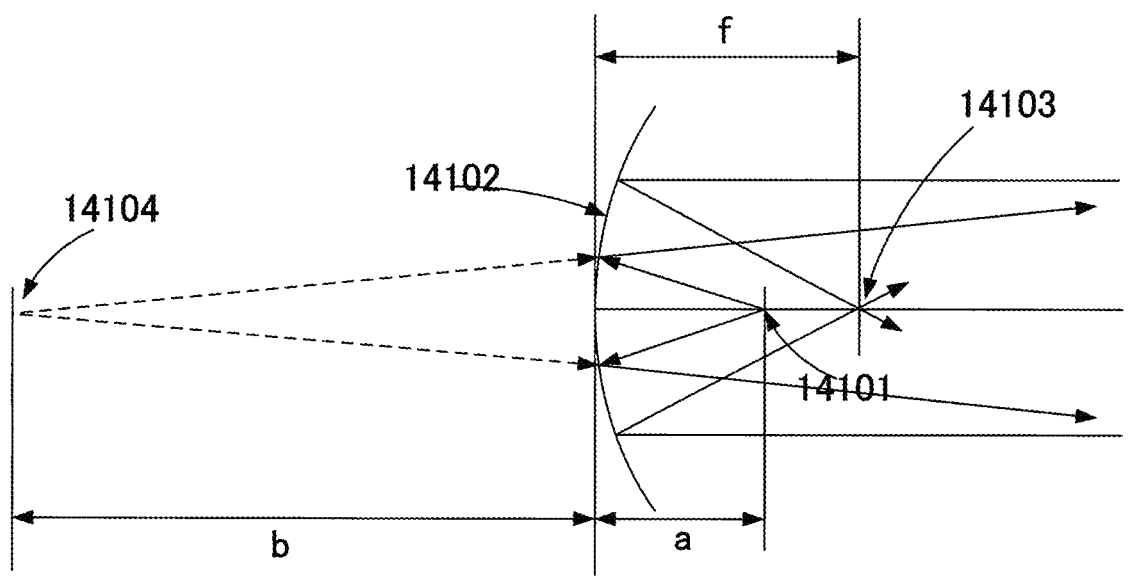
FIG. 14 shows an image is created at a distance even there is a short focal length of the hologram of eyeglass when an object (14101) is located at the left side of focal length (14103), the image is created at the left side of the hologram mirror (14104) and is visible to the eye, because the location of the image can be in focus. This figure teaches that the object located between the hologram (eye-glass, 14102) and the focus of the hologram is visible for viewing by a person wearing the eyeglasses.

FIG. 13 and FIG. 14 show the locations of the object to generate the virtual images for a see-through viewing by a person wearing the display device. As that shown in FIG. 13, an object emitting light (13101) is located at a greater distance than the focus (13103) further away from the mirror (13102) and the image is generated at a location (13104) according to the formula below.

$1/a + 1/b = 1/f$ at the right side of mirror, $a$, $b$ and $f$ are positive.

Figure 15:
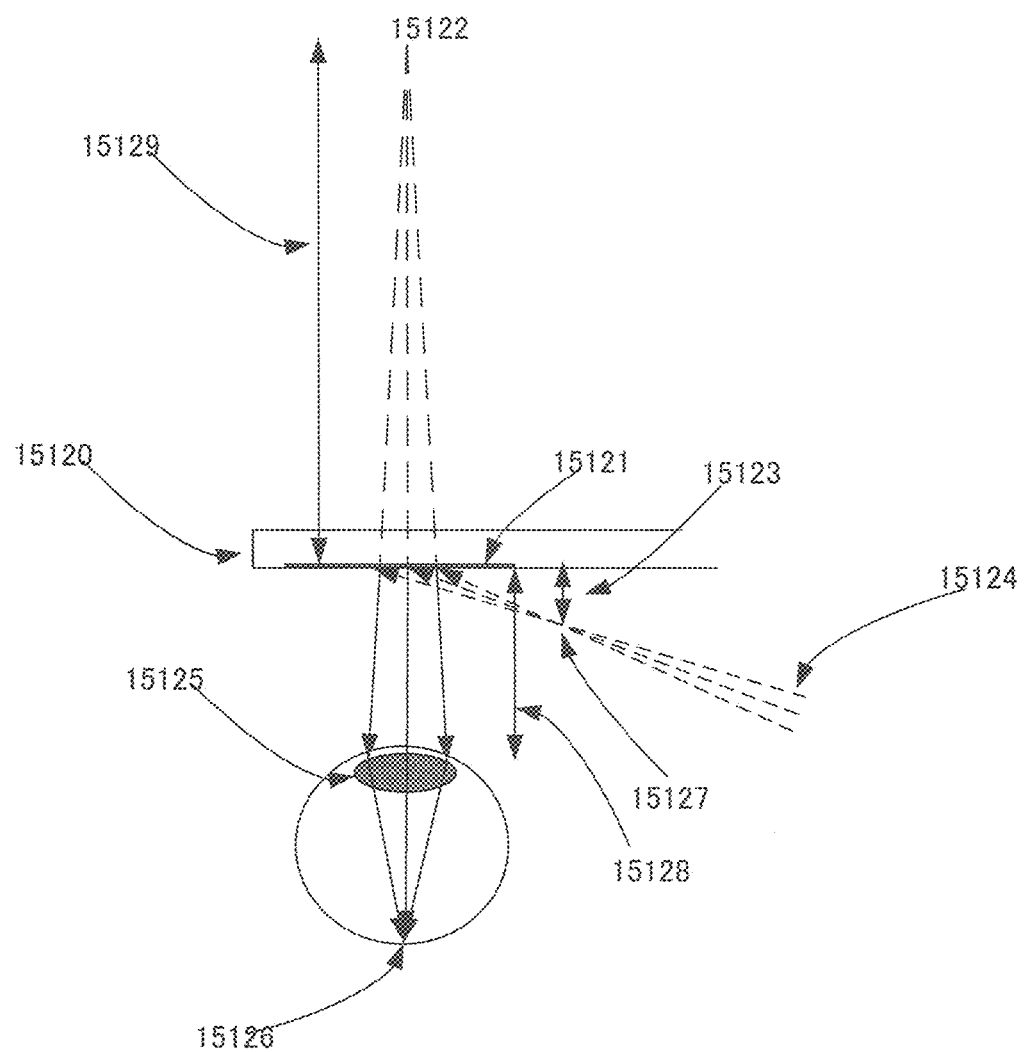
FIG. 15 illustrates the reason why a physical object cannot be between the eye-glass (15120) and a human eye (15125) because when a real image (15127 is created between the eye-glass and the eye causes the creation of a virtual image (15122) at a distance (15129).

According to above equation, under a condition that $a > f$, $b > 0$, the image is located at the right side of mirror. FIG. 14 shows a virtual image (14104) is generated at the left side of mirror wherein $a < f$ where f is the focal length of the mirror (14102). Therefore, the object (14101) is located between the mirror (14102) and the focus (14103). (Please further explain what is purpose of showing FIG. 14) FIG. 15 shows a physical light emitting object is located outside of the optical path between a glass lens (15120) and an eye (15125), and a real image (15127) is located at a location between a mirror (15121) and an eye (15125). Tilted incoming rays (15124) focusing at (15127) creates a real image at the converging point (15127) and the real image is the light projecting object to project lights to the mirror (15121) and creates a virtual image (15122) at the distance (15129). The eye (15125) watches the virtual image (15122) and the light rays (15130) perceive the light rays converge into a point (15126) on the surface of retina. Thus, the human eye (15125) sees an image located a point at (15122). (Please show light rays 15130 in FIG. 15)

Figure 16:
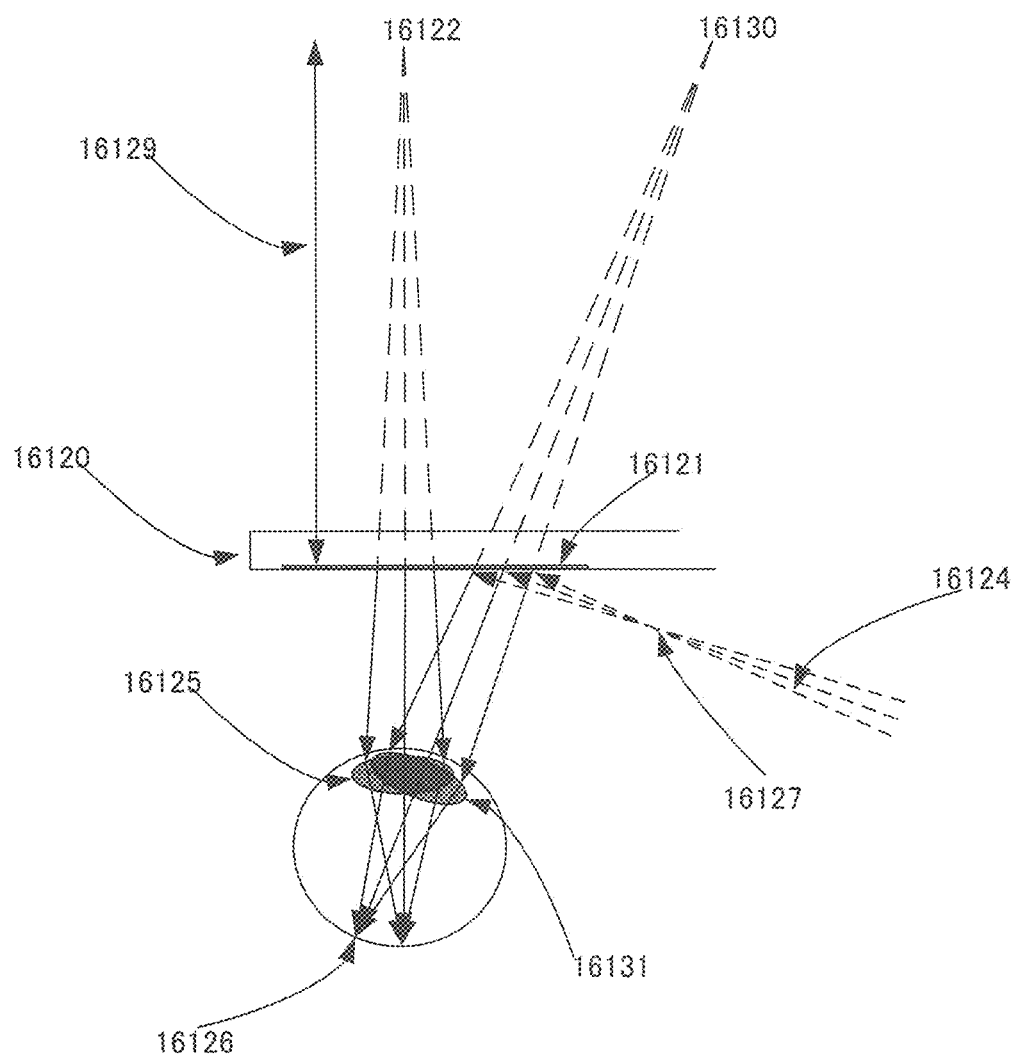
FIG. 16 shows the effect of the movement of eyeball wherein when an eye watches an image along a tilted direction (16130), the eyeball and the pupil (16131) moves toward the object.
Figure 17:
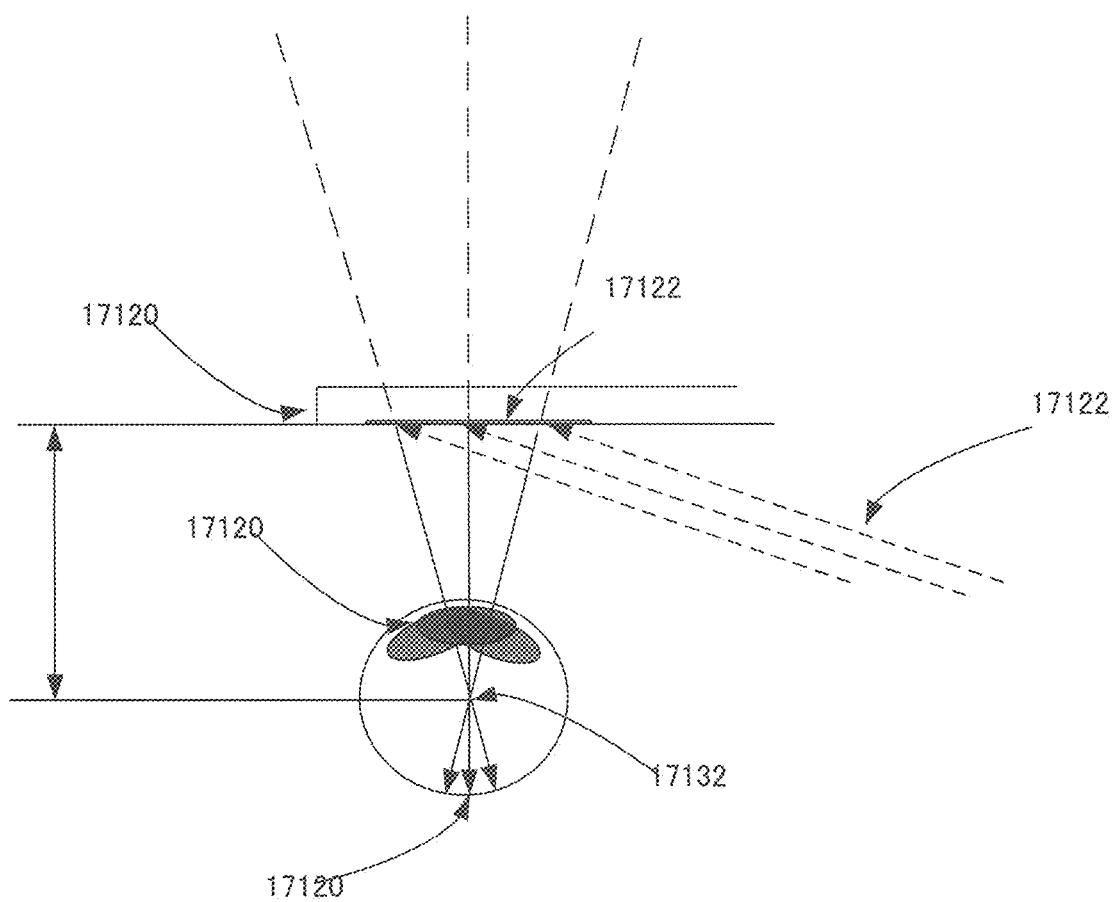
FIG. 17 indicates that the chief rays should cross at the center of eyeball rather than the surface of pupil. This suggests that the focal point of the hologram should be located at the center of eyeball (17131).

FIG. 16 shows an effect of the movement of eyeball. As a viewer watches an image along a tilted direction (16130) that is off axis, the pupil of eyeball (16131) moves toward the tilted direction (16130). The chief rays from virtual images are tilted too to cross the axis at the center of eyeball (17132) as shown in FIG. 17. For a large field of view (FOV), the optical effects must be considered as that shown in FIG. 17 that the chief rays should cross at the center of eyeball rather than the surface of pupil. Therefore, the focal point of the hologram should be located at the center of the eyeball.

Figure 18:
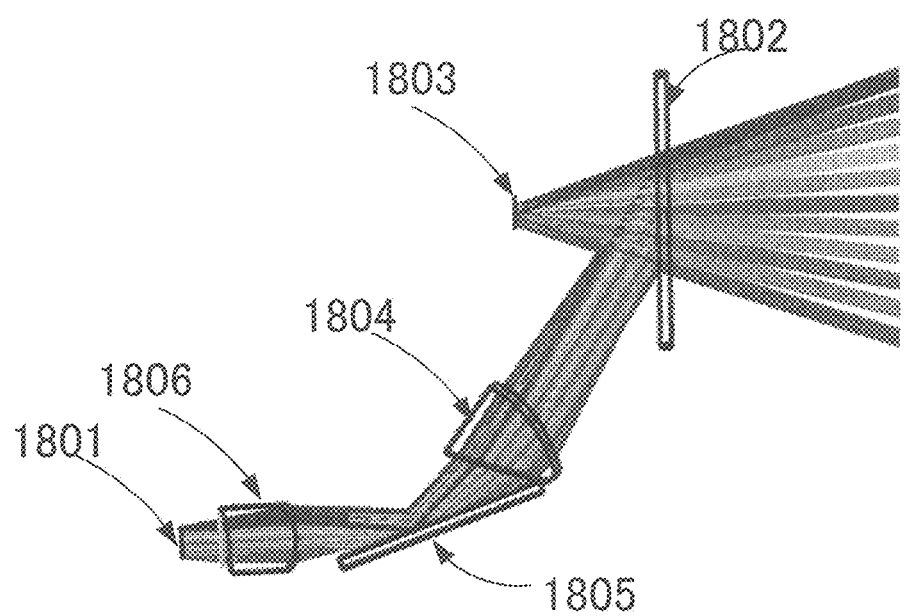
FIG. 18 shows a simple two lens system as another exemplary embodiment of this invention that is suitable up to 1K resolution wherein a relay lens (1806) receives light from a display (1801) and passes to a mirror (1805) and the light beams are bent along the face of a viewer and projected to a prism (1804). The prism creates aberrations to compensate the aberrations of the hologram.
Figure 22:
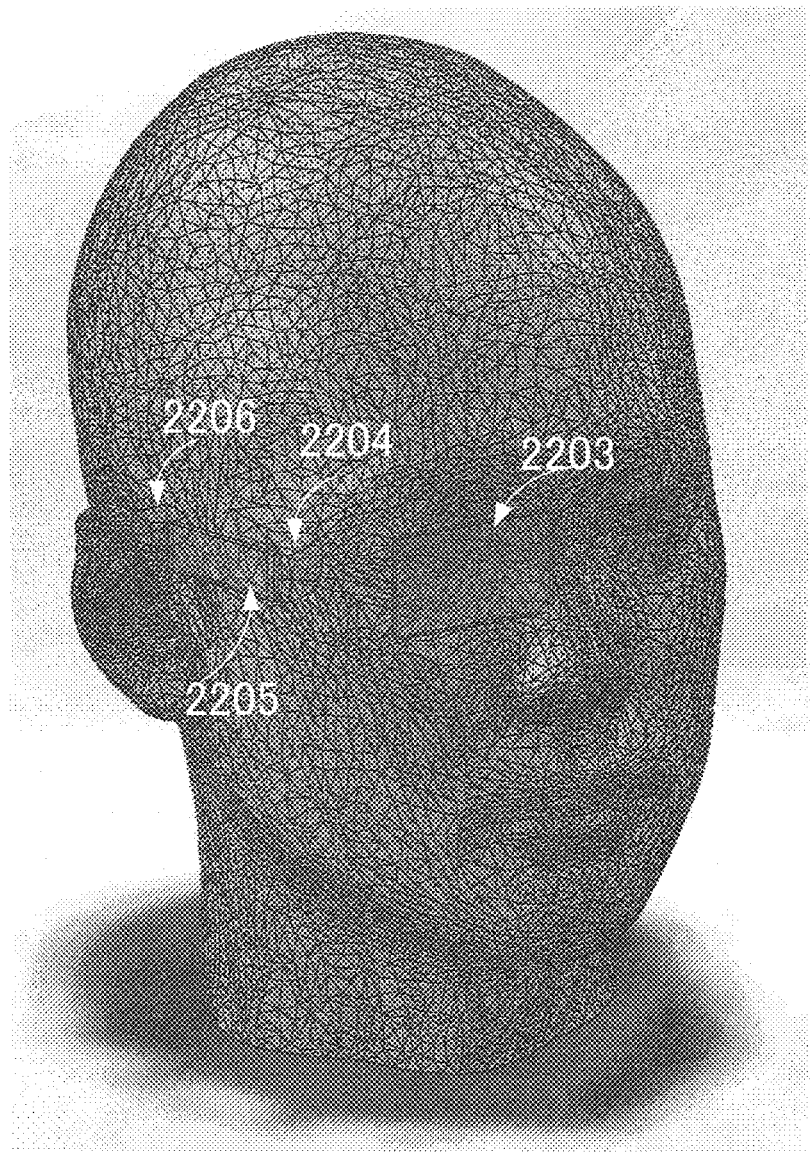
FIG. 22 shows that the shape of the optics described in FIG. 18 that is fitted to a face in 3D CAD to check how to fit the optics to the face and to provide sufficient clearances.

FIG. 18 shows a preferred embodiment wherein an optical element that comprises a hologram or a DOE is located at eyeglass (1802) and diffracts light with specified phase functions for specific wavelengths is projected toward the center of eyeball (1803). The optical element reflects light with specific wavelengths as if a virtual Fresnel mirror and the rest of light will pass through. For the viewer, the image reflected by the optical element and the external scene are superimposed. A display system with light sources located at (1801) that emits light to a relay lens (1806). The display system further comprises a reflective LCOS, a transmissive LCD, a reflective Micro-mirror or a transmissive Microshutter with narrow band light emitting diodes or laser diodes. As shown in FIG. 18, the display system comprises two lenses with free form surfaces (1804 and 1806) and a mirror (1805). A display system implemented with a two-lens system is suitable up to 1K resolution and 40 degrees horizontal FOV. The fitness of this example to a human face is shown at FIG. 22. The mirror (1805) is used to fit a round periphery of a human face.

Figure 19:
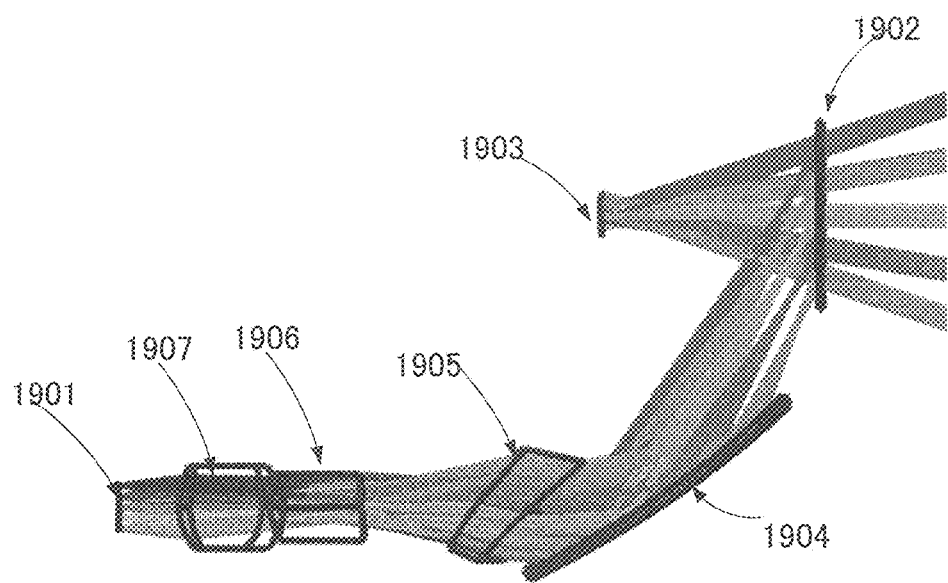
FIG. 19 shows another exemplary embodiment of this invention wherein free-from lenses (1905, 1906 and 1907) and free-form mirror (1904) are used and the mirror is implemented to substantially reduce the thickness of optics. This 3 lens system improves resolution compared with the previous 2 lens system.

Another example of preferred embodiments is shown in FIG. 19, wherein three lenses and a mirror with free form surfaces are used before HOE or DOE (hereafter HOE represents both HOE and DOE)) at glass lens. The mirror (1904) with a free form surface helps to reduce the size of lenses (1905, 1906 and 1907). (Please spell out full English terms for HOE and DOE and explain briefly what they are and how they function. Also, please describe each and every graphic element specifically to satisfy the Patent Office Examiner's requirements).

Figure 20:
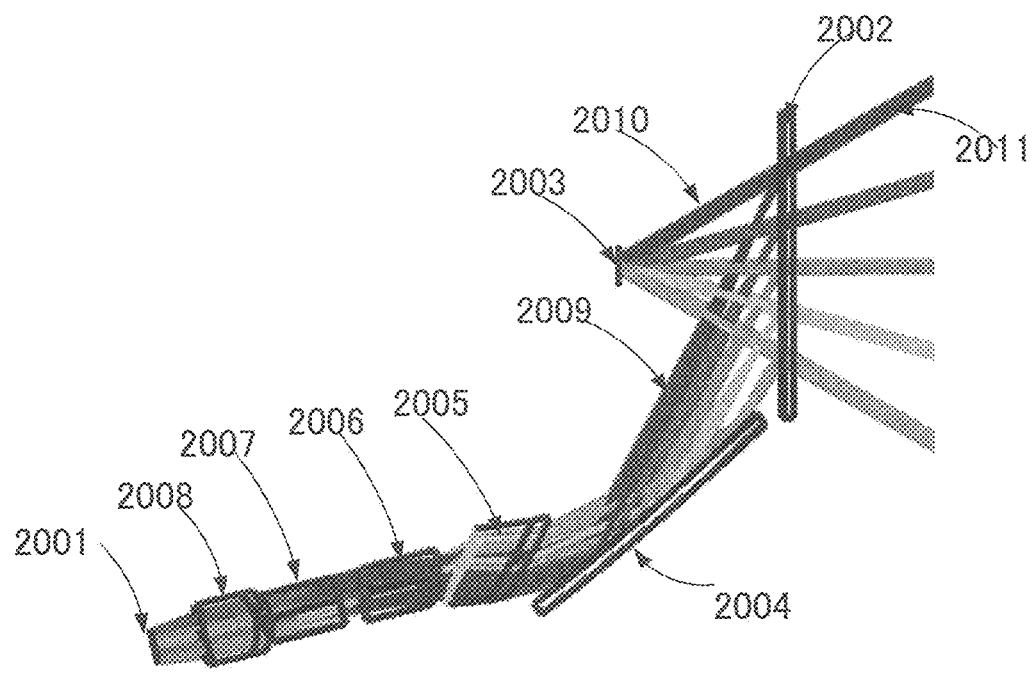
FIG. 20 shows another exemplary embodiment of this invention by implementing 4 free-form lenses (2005, 2006, 2007 and 2008), a free-from mirror (2004) and a hologram (2002) to provide a system that increases the field of view to 67 degrees in diagonal (60 degrees horizontally) with 2K resolution. This system also reduces the width of lens that adds the benefits of enabling the manufacturing of small form-factor of products.
Figure 21:
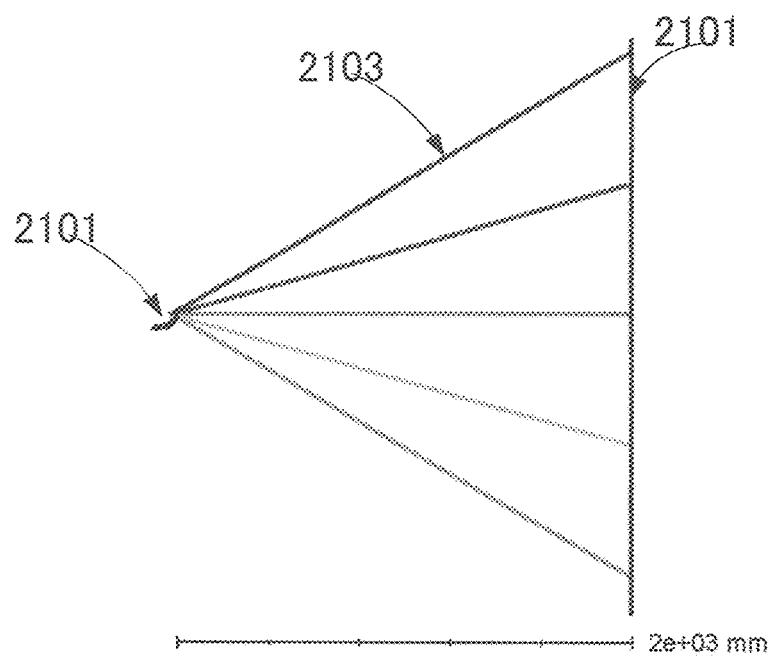
FIG. 21 shows the location of a virtual image (2102) wherein an eyeglass display (2101) projects image light toward an eye and the extrapolated lines of the image light to the opposite direction (2103) form a virtual image on the plane (2102).
Figure 23:
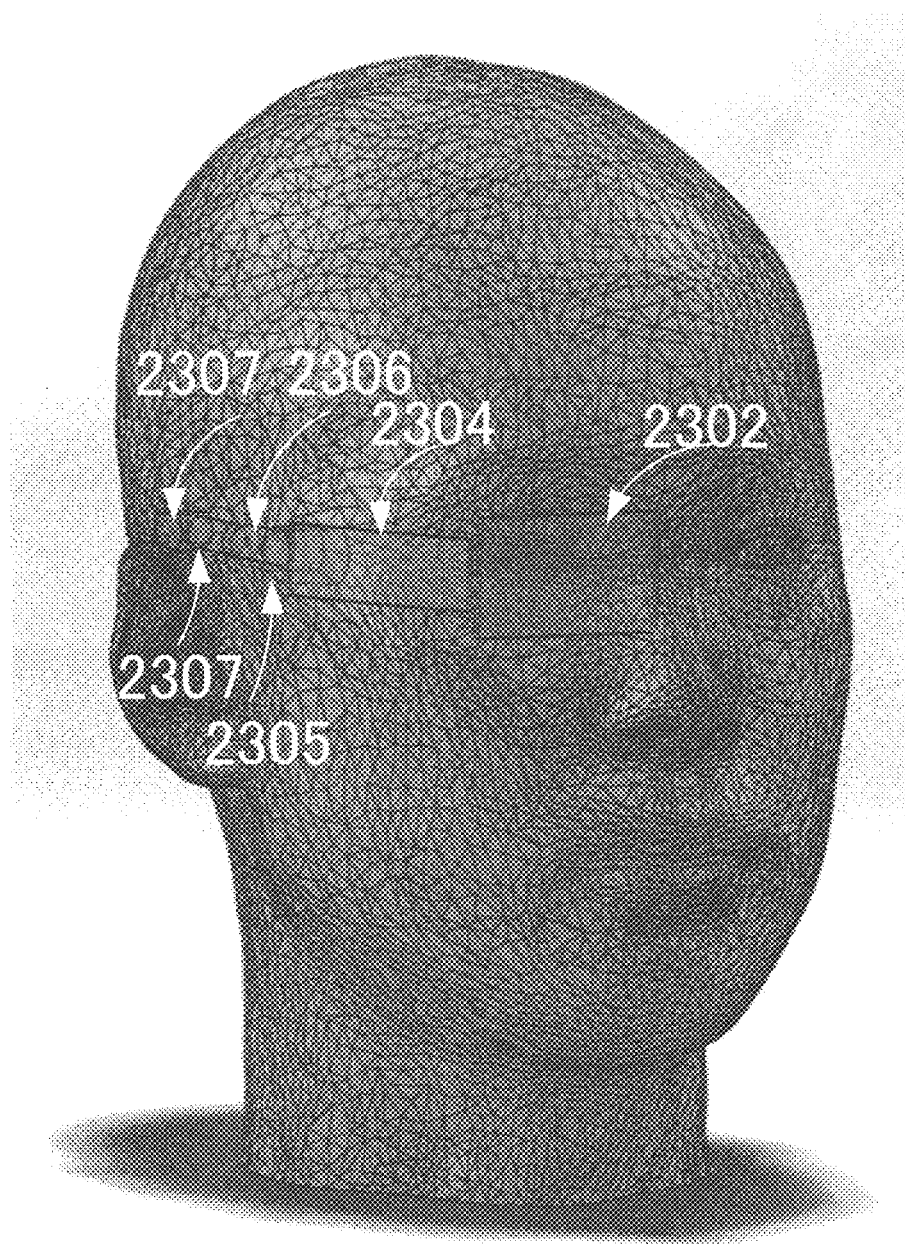
FIG. 23 shows the shape of the optics described in FIG. 19 that is fitted to a face in 3D CAD to check how to fit the optics to the face and to provide sufficient clearances.
Figure 24:
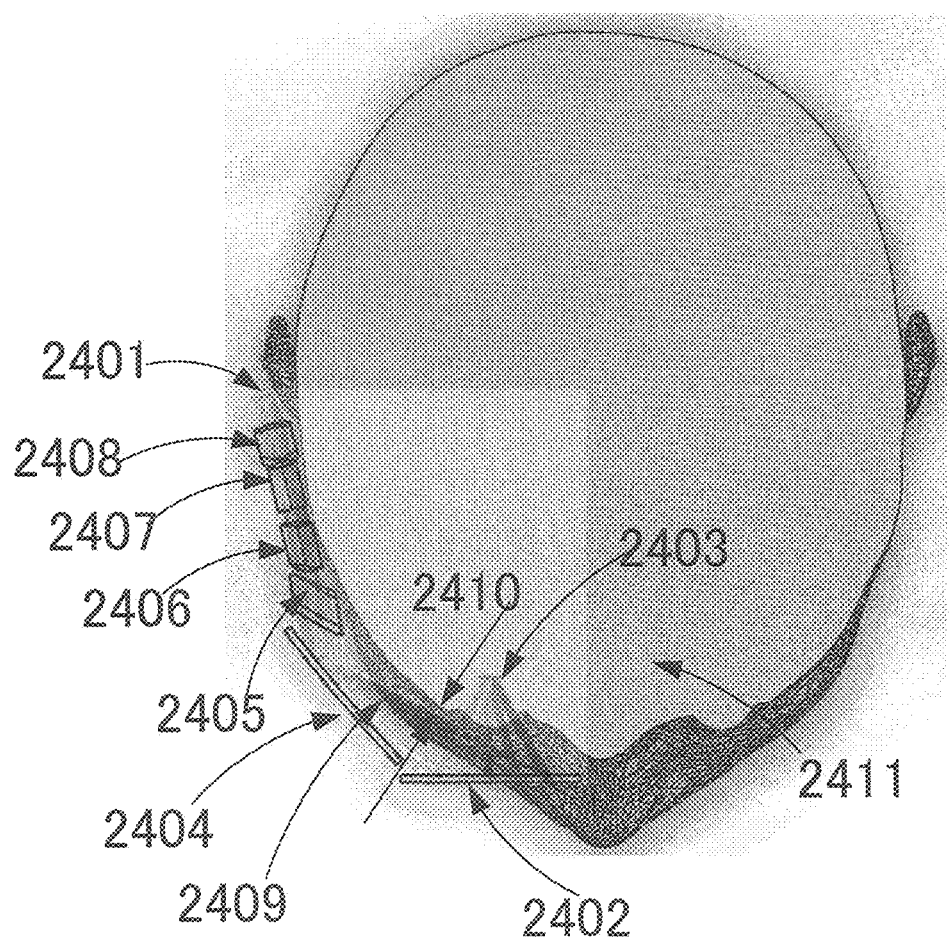
FIG. 24 shows a cross section view of human head (gray area, 2411) at the center of eyes (2003) and the rays (2409) of projected light by a hologram (2002) wherein the clearance between the rays and the face is shown as (2410).

Another preferred embodiment is illustrated in FIG. 20 that is implemented with four lenses and a mirror with free form surfaces. The tilted incoming rays (please designate a number to point out where is the tilted incoming rays specifically) cause high coma and astigmatic aberrations at the HOE, these aberrations are compensated prior to the eyeglass. The required aberrations are illustrated in FIG. 28. The incoming light rays are bent more in sagittal plane (horizontal direction) than in tangential plane (vertical direction) by the HOE. This causes shorter horizontal focal length and longer vertical focal length of HOE. This difference must be compensated by the lenses and the mirror, so that the converging points in horizontal direction (28105) have to be closer to HOE (28101) than those of vertical direction (28104). These correction can be done with non-symmetric lens or mirror with free form surfaces. (The descriptions jumping from FIG. 20 to FIG. 28 make the descriptions difficult to understand) Spherical and aspherical lens or mirror has a rotational symmetry which cannot create these non-symmetries without tilt or off-axis shift. (There is no descriptions of FIG. 21 and FIG. 22). FIG. 23 shows the fitness of this example to face. A display and lenses (please provide numbers here to show the lenses and how are they arranged) are arranged relatively in a straight line (can we show the line on FIG. 23?) and a mirror (where is the mirror?) is arranged to fit a round periphery of face. The mirror helps to reduce the width of optical system to embed in a temple of an eyeglass. FIG. 24 shows a person wears the eyeglasses with the clearance of light rays (2410) from the periphery of face, wherein the gray area (2411) is a cross section of the face at the center of eye (2103) (there is no 2103 in this Figure). The incident angle to the HOE of this example is 60 degrees at the center of HOE and the marginal area is even larger (Where is the HOE, Please explain). This four lens system provides a very large FOV, 60 degrees in horizontal and 67 degrees in diagonal with 2K resolution and full color and the image size is 2.3 m wide and 1.3 m high at 2 meter distance.

Figure 25:
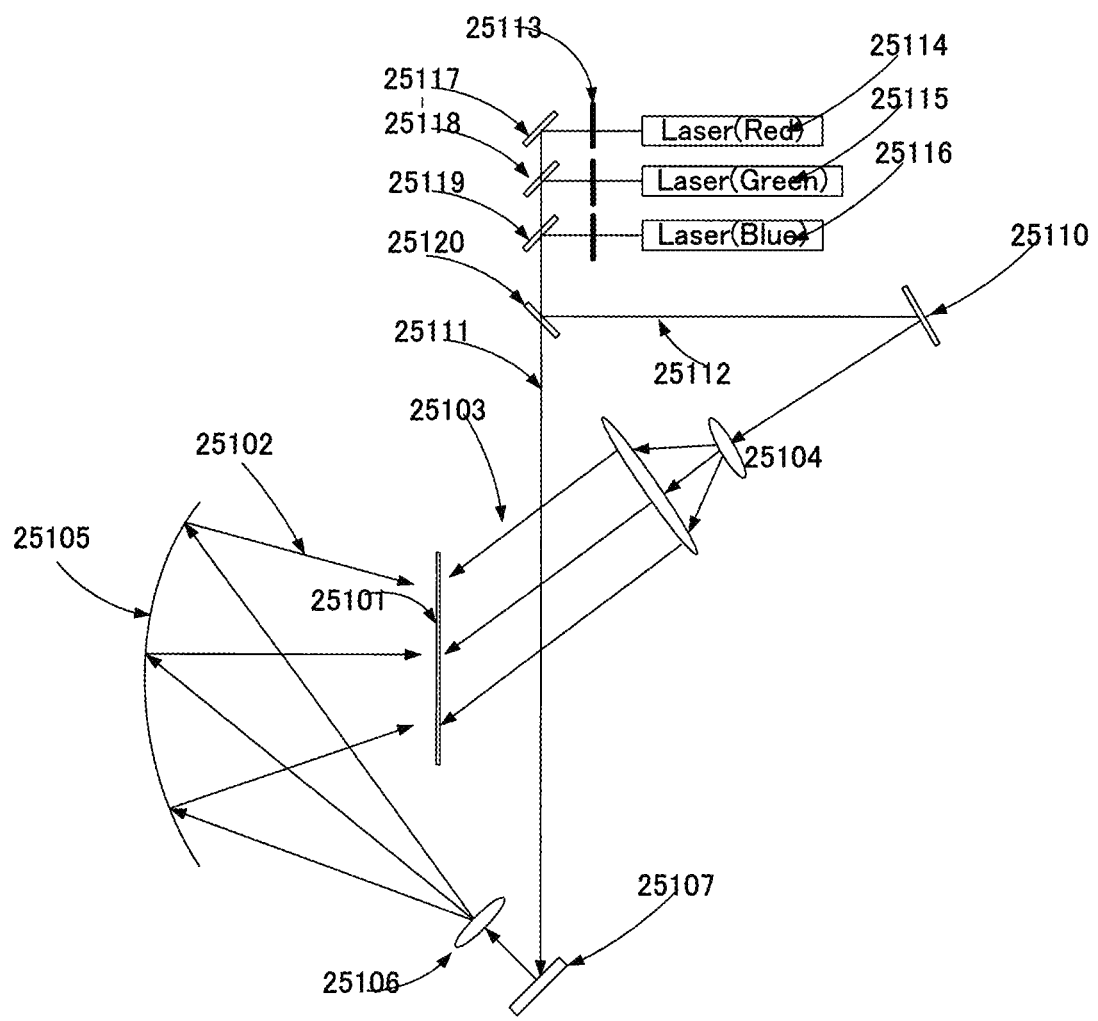
FIG. 25 shows a method to produce a hologram (25101) by using a collimated laser beam (25103) and a reflected laser beam (25102) and a free-form mirror (25105) which is substantially concave.

FIG. 25 shows another preferred embodiment, wherein a manufacturing method of HOE is illustrated. Laser light sources with primary colors are placed at (25114, 25115 and 25116) with optical shutters (25113) and dichroic mirrors (25118, 25119) are used to combine laser beams into a single beam. The multiple wavelength beams are split into two beams (25111 and 25112). One of the beams is collimated with a lens (25104) and exposes a hologram (25101). Simultaneously, the other beam (25111) is led to a free form surface mirror (25105) and reflected to the hologram. The surface of the mirror has to be designed so that the phases of the wave-front of reflected light beams emulate those of HOE.

Figure 26:
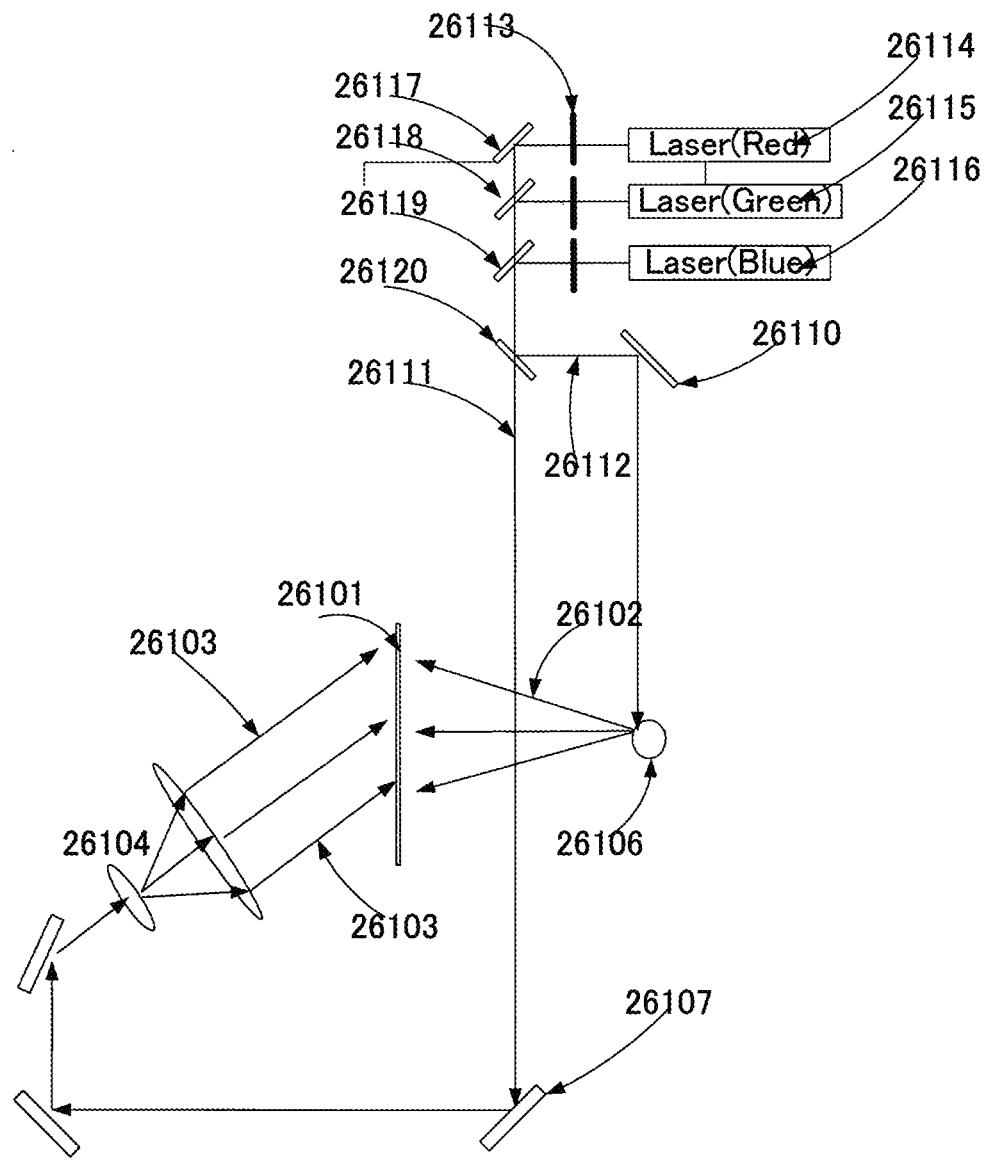
FIG. 26 shows another method to produce a hologram (26101) by using a collimated laser beam (26103) and a reflected laser beam (26102) and a free-form mirror (26106) which is substantially convex.

FIG. 26 illustrates another preferred embodiment. After splitting a combined beam, a round mirror (26106) with a free form surface is used to expose a hologram (26101). The phases of wave-front have to emulate those of HOE, so that the reflected light creates the same virtual image as designed.

Figure 27:
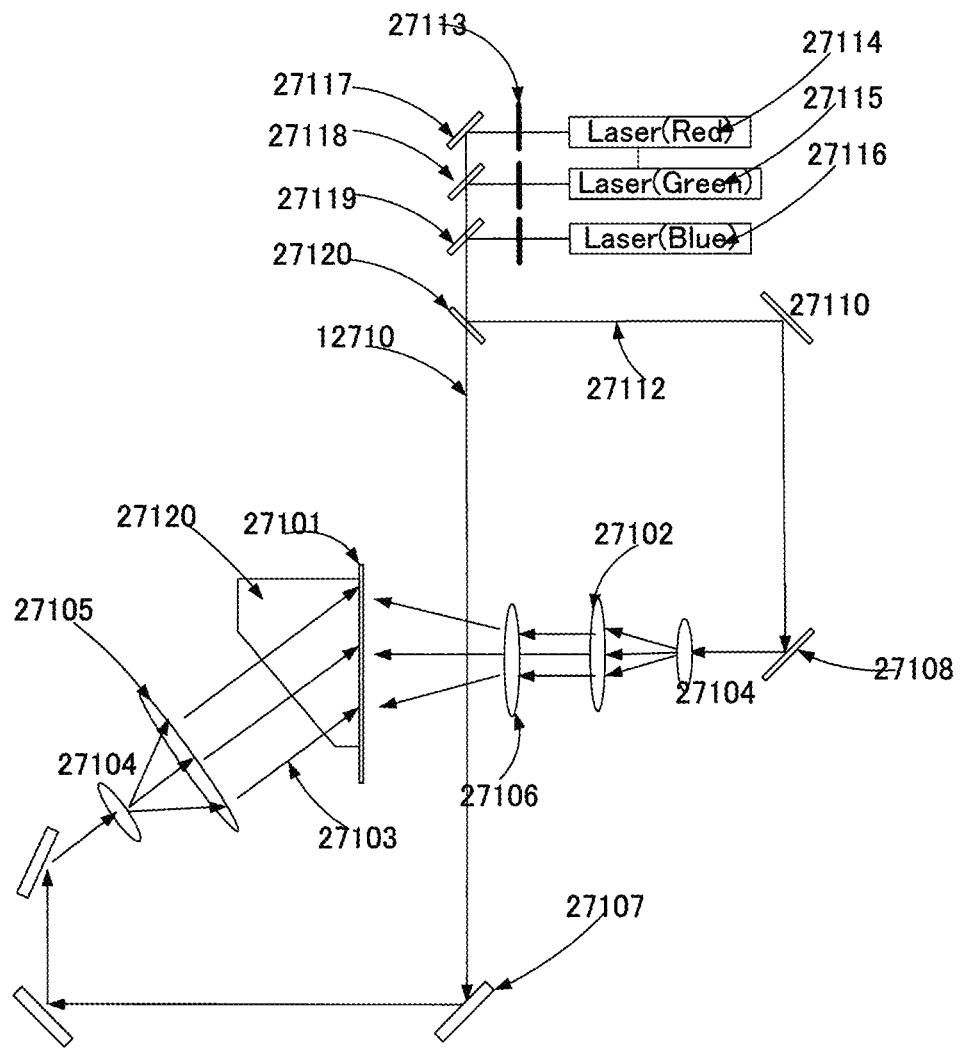
FIG. 27 shows another method to produce a hologram (27101) by using a collimated laser beam (27103) through a prism (27120) and a transmissive laser beam (27121) and a free-form lens (26106) which is substantially convex. The prism is to avoid TIR (total internal reflection) at the surface of substrate plate holding hologram (27101).
Figure 28:
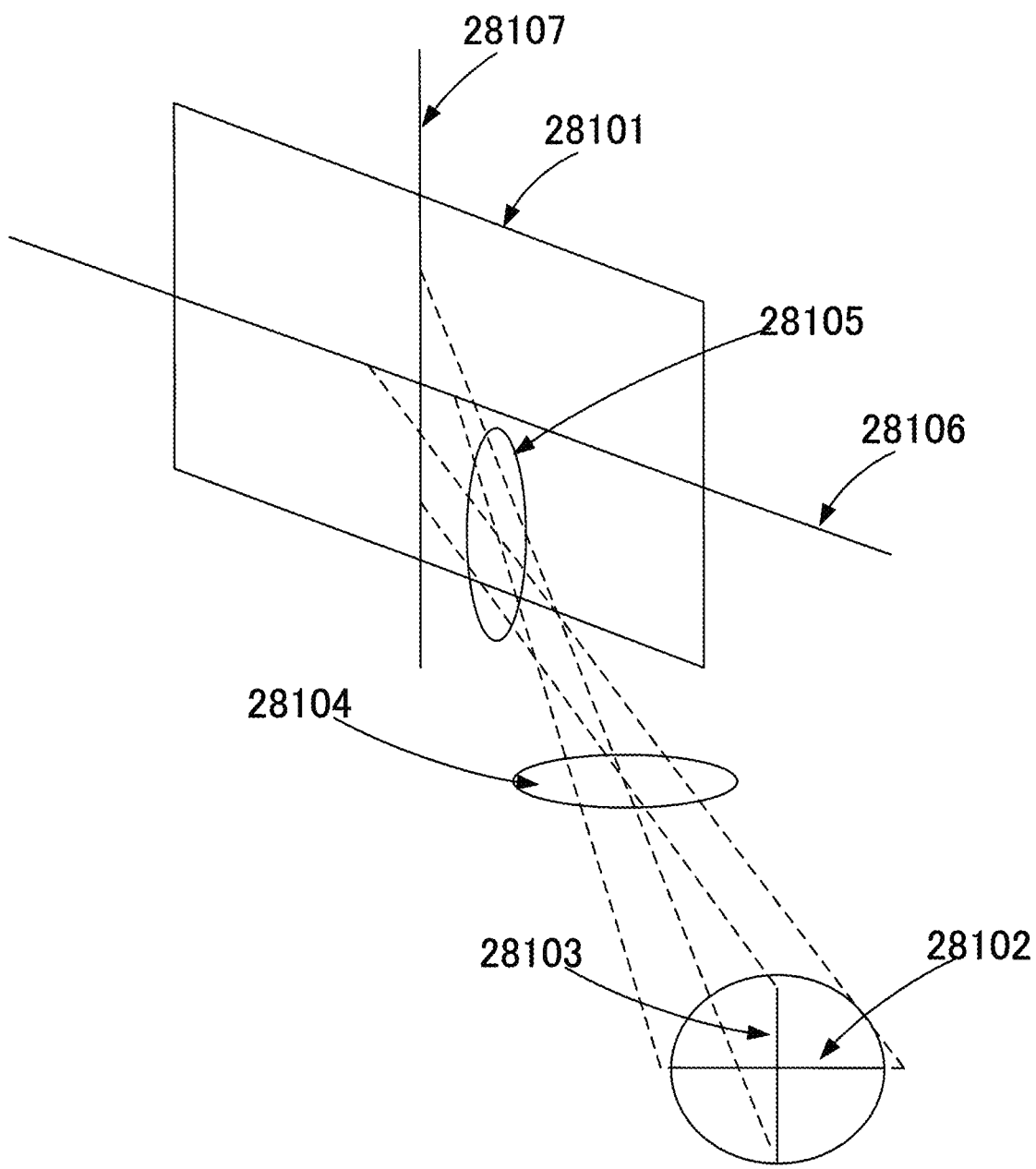
FIG. 28 shows another exemplary embodiment of this invention wherein a laser light beam having a horizontal cross section (28102) and a vertical cross section (28103) is projected toward a hologram (28101). The beam is focused at a location (28104) in tangential (vertical) plane and at another location (28105) in sagittal (horizontal) plane with a finite distance between these two locations.

FIG. 27 illustrates another example of preferred embodiments, wherein a lens with free form surface (27106) is used to emulate the phase of wave-front of light beams. A collimated light beam (27103) is led to a prism (27120) which avoids TIR (total internal reflection) by a glass substrate of hologram. FIG. 28 shows another exemplary embodiment of this invention wherein a laser light beam having a horizontal cross section (28102) and a vertical cross section (28103) is projected toward a hologram (28101). The beam is focused at a location (28104) in tangential (vertical) plane and at another location (28105) in sagittal (horizontal) plane with a finite distance between these two locations.

Figure 29:
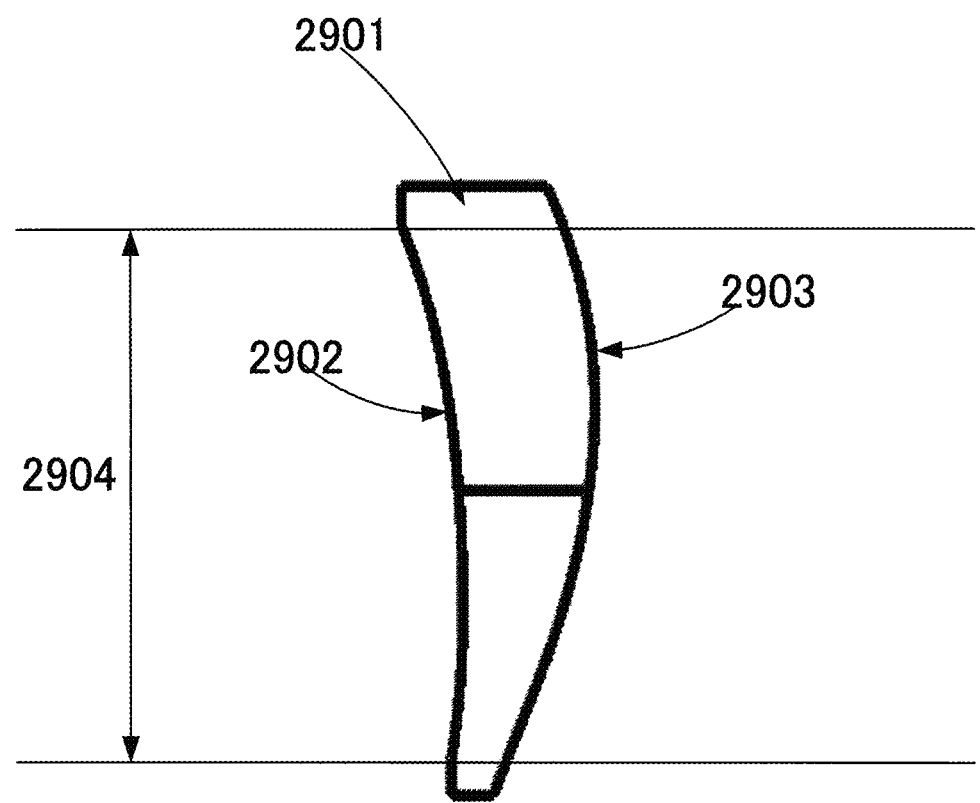
FIG. 29 shows another exemplary embodiment of free-form-lens(2901) having free-form-surfaces (2902 and 2903) and a lens region(2904) where light beams pass. In this application, free-form-surface is defined as a surface which does not have a coaxial symmetric axis within the lens region.

FIG. 29 shows another exemplary embodiment of free-form-lens(2901) having free-form-surfaces (2902 and 2903) and a lens region(2904) where light beams pass. In this application, free-form-surface is defined as a surface which does not have a coaxial symmetric axis within the lens region.

Figure 30:
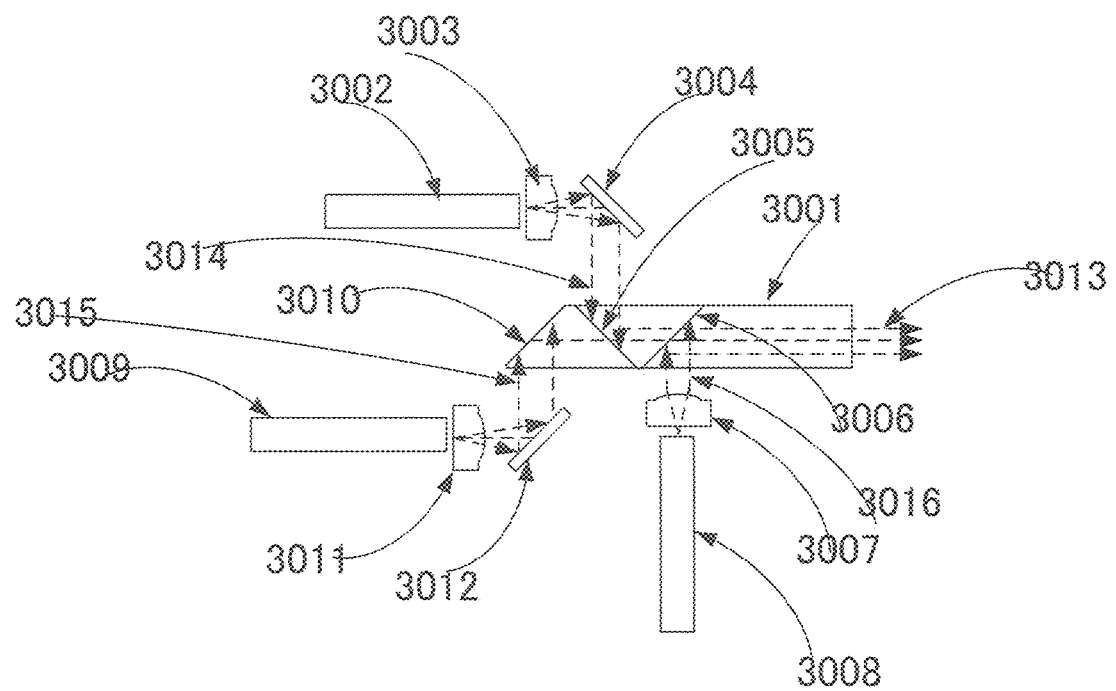
FIG. 30 shows another exemplary embodiment of this invention.

FIG. 30 shows another exemplary embodiment of this invention wherein 3001 is a beam combiner which combines three color beams (3014,3015, 3016) into a single beam (3013). For example, 3002, 3008 and 3009 are blue lasers or LEDs which are most efficient among 3 colors. It is difficult to find efficient red and green light sources in laser and LED, but very efficient blue laser and LED are available commercially. A plate 3004 has a phosphor which converts blue light to red light and 3012 is a plate having a phosphor which converts blue light to green light. The light beams (3014, 3015 and 3016) are integrated and make a single beam (3013) by the integrator 3001. 3015 is reflected by the mirror(3010) and 3014 is reflected by the dichroic mirror (3005) which reflects only red light but passes green light and another dichroic mirror 3006 reflects blue but passes green and red lights.

Figure 31:
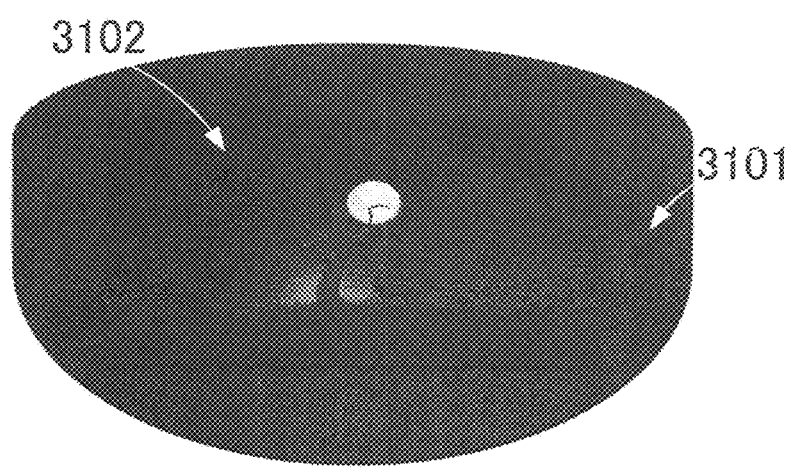
FIG. 31 shows another exemplary embodiment of this invention wherein an eyeglass 3101 and the display area (3102) has a layer of variable light transmission.

FIG. 31 shows another exemplary embodiment of this invention wherein an eyeglass 3101 and the display area (3102) has a layer of variable light transmission. The image in 3102 will have a better contrast under bright ambient.

While specific embodiments of the invention have been illustrated and described herein, it is realized that other modifications and changes will occur to those skilled in the art. It is therefore to be understood that the appended claims are intended to cover all modifications and changes as fall within the true spirit and scope of the invention.

We claim:

1. A see-through display system comprising:
    a light source controlled by the see through display system for emitting light beams for generating a virtual image;
    a see-through optical element selected from a group of optical elements consist of a holographic optical element (HOE) and a diffractive optical element (DOE) wherein the see-through optical element is disposed in front of eyeballs of a viewer;
    a projection optics having at least one mirror and at least one lens with at least one lens having a free form surface; and wherein said projection optics guides and projects light beams from said light source toward said see-through optical element wherein a focal length of the see-through optical element is substantially a distance between the see-through optical element and a center of the eyeballs of the viewer.

2. The see-through display system of claim 1 further comprising:
    an eyeglass having an eyeglass frame for supporting and embedding the see-through display system therein.

3. The see-through display system of claim 1 wherein:
    the projection optics further guiding the light beams projected from the light source to transmit along a curved periphery to conform substantially with a face of the viewer.

4. The see-through display system of claim 1 wherein:
    the projection optics comprises the one lens with one free form surface is a lens having a rotationally asymmetrical surface.

5. The see-through display system of claim 1 wherein:
    the projection optics comprises the one lens with the free form surface is an aspheric lens whose coaxial symmetric axis is offset.

6. The see-through display system of claim 1 wherein:
    the projection optics comprises a mirror of the free form surface.

7. The see-through display system of claim 1 wherein:
    the light source further comprises a group of laser activated phosphor and a laser with a second-harmonic-generation.

8. The see-through display system of claim 1 wherein:
    the see-through optical element further comprises a layer selected from a group consisted of a photo-chromic material, an electro-chromic material and a liquid crystal, having varying degrees of light transmission.

9. The see-through display system of claim 1 wherein:
    the see-through optical element further comprises an ultra-violet (UV) protective layer.

10. The see-through display system of claim 1 further comprising;
    the projection optics comprises a non-symmetric lens.

11. The see-through display system of claim 1 wherein:
    the projection optics further comprises an adaptive lens selected from a group of optical elements consisted of a LCD, an analog micromirror array and an electro-optical material.

12. The see-through display system of claim 1 wherein:
    the projection optics further comprises a speckle removing optical element selected from a group of optical elements consisted of a micromirror, a piezo oscillating diffuser and a multiple-layers of diffuser.

13. The see-through display system of claim 1 wherein;
    the projection optics guides and projects light beams from said light source toward said see-through optical element wherein a minimum horizontal width of the optical beams is located closer to the see-through optical element than a point where the light beams having a minimum vertical width.

* * * * *